US008286318B2

(12) United States Patent
Tanaka et al.

(10) Patent No.: US 8,286,318 B2

(45) Date of Patent: Oct. 16, 2012

(54) STAGE APPARATUS ASSEMBLING METHOD

(75) Inventors: Yasuzo Tanaka, Chigasaki (JP); Junpei Yuyama, Chigasaki (JP); Mitsuru Yahagi, Chigasaki (JP); Hirofumi Minami, Chigasaki (JP); Makoto Takahashi, Hidaka (JP); Shinya Ito, Hidaka (JP)

(73) Assignee: Ulvac, Inc., Chigasaki-shi (JP)

( * ) Notice: Subject to any disclaimer, the term of this patent is extended or adjusted under 35 U.S.C. 154(b) by 383 days.

(21) Appl. No.: 12/710,759

(22) Filed: Feb. 23, 2010

(65) Prior Publication Data

US 2010/0146762 A1 Jun. 17, 2010

Related U.S. Application Data

(63) Continuation-in-part of application No. PCT/JP2008/065243, filed on Aug. 27, 2008.

(30) Foreign Application Priority Data

Aug. 28, 2007 (JP) ................................ 2007-221403

(51) Int. Cl.
*B23Q 17/00* (2006.01)
*B23P 19/00* (2006.01)
*A47B 11/00* (2006.01)

(52) U.S. Cl. ................... 29/407.1; 29/407.09; 29/426.2; 29/464; 29/466; 108/102; 108/137

(58) Field of Classification Search ............... 29/407.09, 29/407.1, 426.2, 426.3, 426.1, 464, 466; 347/104; 118/500; 108/102, 137
See application file for complete search history.

(56) References Cited

U.S. PATENT DOCUMENTS

| | | | | |
|---|---|---|---|---|
| 5,940,092 | A * | 8/1999 | Kashimura et al. | 347/8 |
| 6,652,054 | B2 * | 11/2003 | Regev et al. | 347/8 |
| 7,073,239 | B2 * | 7/2006 | Miller | 29/407.05 |
| 7,874,261 | B2 * | 1/2011 | Yamasaki et al. | 118/500 |
| 7,905,198 | B2 * | 3/2011 | Moon | 118/500 |
| 7,908,995 | B2 * | 3/2011 | Inamasu et al. | 118/300 |
| 8,100,524 | B2 * | 1/2012 | Tanaka et al. | 347/104 |

(Continued)

FOREIGN PATENT DOCUMENTS

JP 11-340692 12/1999

(Continued)

OTHER PUBLICATIONS

International Search Report for International Application No. PCT/JP2008/065243 dated Oct. 24, 2008.

*Primary Examiner* — Essama Omgba
(74) *Attorney, Agent, or Firm* — Kratz, Quintos & Hanson, LLP

(57) ABSTRACT

An assembling method that is high in assembly accuracy and easily performed at the actual installation site is provided. In this method, the sub base plates on the sub mounting tables are aligned with respect to a main base plate on a main mounting table at a temporary installation site, and the state thereof is maintained. Then, the main mounting table and the sub mounting tables are separated from each other to be transferred to the actual installation site, and the positioning state is restored at the actual installation site. Since a positional alignment can be performed at the temporary installation site, the work required at the actual installation site can be reduced. Furthermore, since a fine adjustment can be performed at the actual installation site, the accuracy in the positional alignment can be improved.

3 Claims, 9 Drawing Sheets

U.S. PATENT DOCUMENTS

| | | | | |
|---|---|---|---|---|
| 2009/0092467 | A1* | 4/2009 | Tanaka et al. | 414/222.01 |
| 2009/0173278 | A1* | 7/2009 | Tanaka et al. | 118/500 |
| 2009/0218511 | A1* | 9/2009 | Tanaka | 250/453.11 |
| 2010/0163703 | A1* | 7/2010 | Tanaka et al. | 248/346.06 |
| 2010/0165065 | A1* | 7/2010 | Nakajima et al. | 347/104 |
| 2010/0177153 | A1* | 7/2010 | Tanaka et al. | 347/104 |

FOREIGN PATENT DOCUMENTS

| | | | |
|---|---|---|---|
| JP | 2000-167734 | | 6/2000 |
| JP | 2004-172500 | A1 | 6/2004 |
| JP | 2007-73688 | A1 | 3/2007 |
| JP | 2008-93651 | A1 | 4/2008 |
| JP | 2008-246653 | A1 | 10/2008 |

* cited by examiner

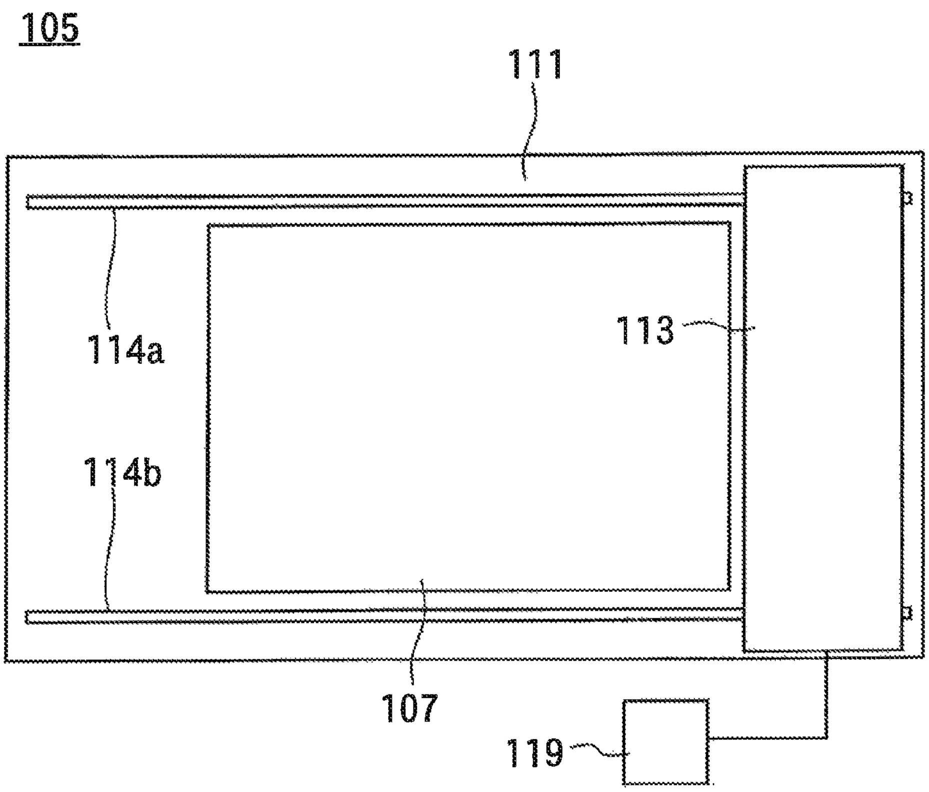
Fig. 9 (a) PRIOR ART
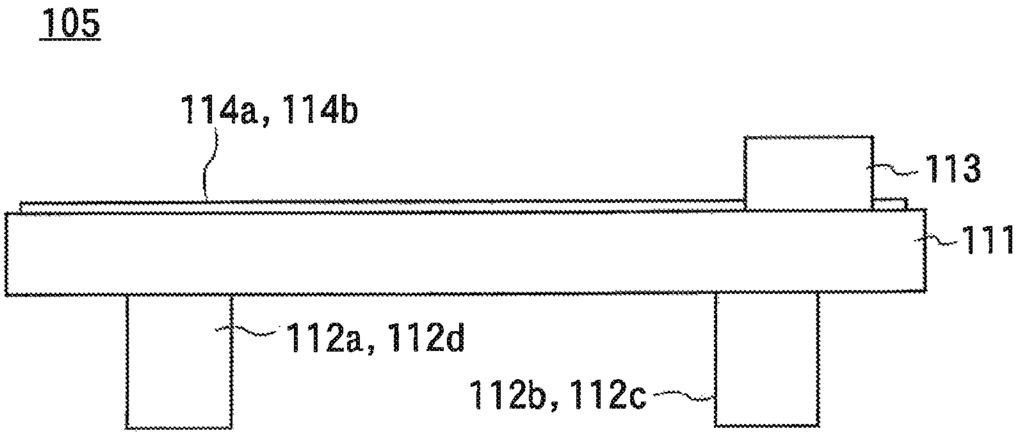
Fig. 9 (b) PRIOR ART

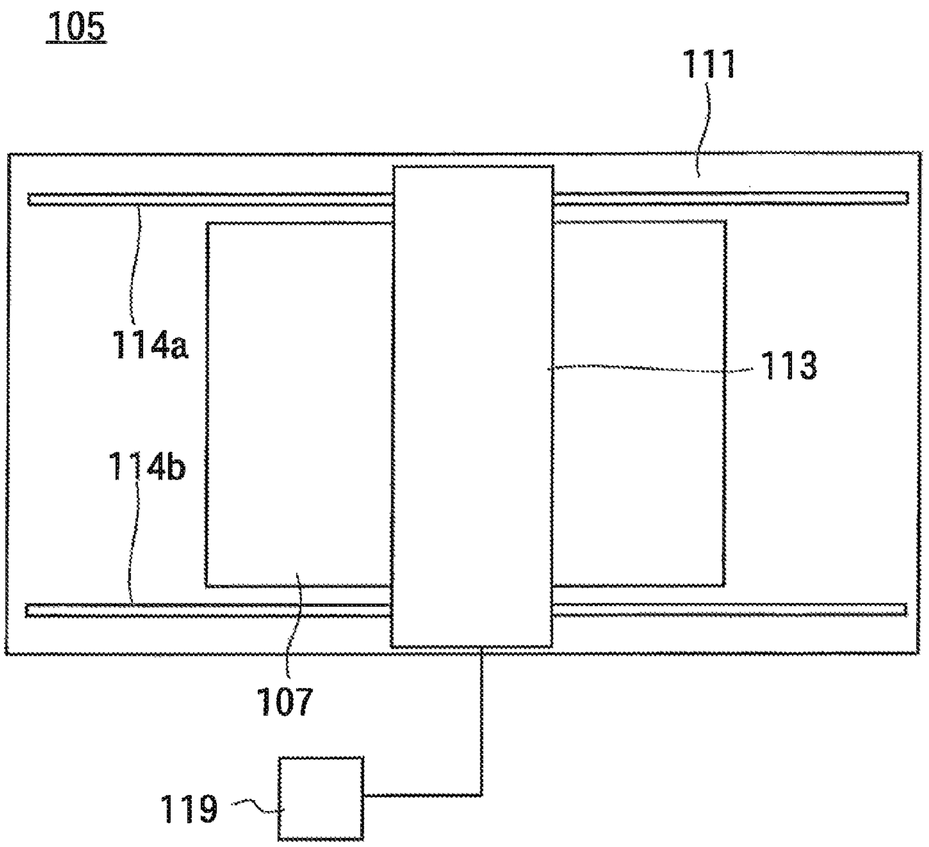
Fig. 10 (a) PRIOR ART
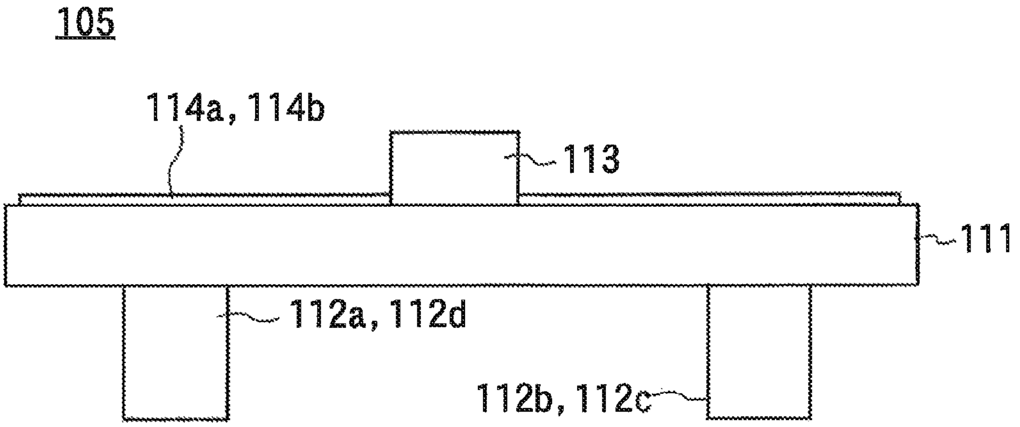
Fig. 10 (b) PRIOR ART

STAGE APPARATUS ASSEMBLING METHOD

This application is a continuation-in-part of International Application No. PCT/JP2008/065243, filed Aug. 27, 2008, which claims priority to Japan Patent Application No. 2007-221403, filed Aug. 28, 2007. The entire disclosures of the prior applications are herein incorporated by reference in their entireties.

FIELD OF THE INVENTION

The present invention generally relates to stage apparatuses, and particularly relates to a method of assembling a stage apparatus.

BACKGROUND OF THE INVENTION

The reference numeral 105 in FIG. 9 represents a stage apparatus of a conventional technology.

The stage apparatus 105 includes a base plate 111, and the base plate 111 is mounted on a floor with four leg sections 112*a* to 112*d* disposed at the four corners on the back surface side of the base plate 111.

The rails 114*a*, 114*b* are arranged on the upper surface of the base plate 111, and an ejection device 113 is mounted thereon, A print head is disposed on a surface of the ejection device 113 that faces the base plate 111. The print head is connected to a tank 119 that supplies the print head with an ejection liquid. When a substrate 107 is mounted on the base plate 111 and the ejection liquid is ejected from the print head, the ejection liquid lands on the substrate 107.

The ejection device 113 is movable along the rails 114*a*, 114*b*. Thus, when the ejection device 113 ejects the ejection liquid above the substrate 107, as shown in FIG. 10, it is possible to land the ejection liquid at a desired position on the surface of the substrate 107.

This ejection liquid can be, for example, a raw material of an organic thin film for a liquid crystal oriented film, a spacer dispersion liquid for a liquid crystal display device, a raw material of a light emitting layer of an organic EL element, or the like. In addition, the stage apparatus 105 can be used to eject the ejection liquid onto a large substrate.

However, there is a trend that the substrates subjected to the ejection are becoming larger and larger. Accordingly, the stage apparatuses are also becoming larger, making it difficult to transport a stage apparatus manufactured in a manufacturing plant to its installation site due to problems related to cost and transportation law.

A countermeasure has been taken in conventional technologies for such a circumstance. For instance, an attempt has been made to divide the base plate and to transport the divided pieces to the installation site. Please refer to Japanese Unexamined Patent Application Publication No. 2007-73688.

SUMMARY OF THE INVENTION

However, to assemble a once-divided base plate at an installation site, a lot of time and effort are required for position alignment. Otherwise, the assembly accuracy can be degraded. Therefore, a solution for avoiding the above-described problem is desired.

To solve the above-described problems, an embodiment of the present invention is directed to a stage apparatus assembling method of assembling a stage apparatus by aligning a main base plate provided on a main mounting table and a sub base plate provided on a sub mounting table based on a relative positional relationship between them at an actual installation site, and then coupling the main mounting table and the sub mounting table. An embodiment of the present invention is directed to such a method including the steps of: aligning the positions of the sub base plate and the main base plate to each other in advance at a temporary installation site that is different from the actual installation site, preserving a state of position alignment between the sub base plate and the main base plate, subsequently separating the main mounting table and the sub mounting table from each other, transporting the main mounting table and the sub mounting table to the actual installation site, restoring the state of position alignment at the actual installation site, and coupling the main mounting table and the sub mounting table in order to assemble the stage apparatus. Further, an embodiment of the invention is directed to the stage apparatus assembling method including: a coarse adjustment step of coarsely adjusting the relative positional relationship between the sub base plate and the main base plate to a coarsely-adjusted positional relationship including a coarse adjustment error; a temporary positioning step of moving the sub mounting table with respect to the main mounting table to bring a positioning member provided on the sub mounting table into contact with a guide section provided on the main mounting table, and making, in the contact state, a positional relationship between the sub base plate and the positioning member, a positional relationship between the positioning member and the guide section, and a positional relationship between the guide section and the main base plate to be in a fixed state; a separation step of relatively moving the sub mounting table and the main mounting table to separate the positioning member from the guide section, and separating the sub mounting table from the main mounting table at the temporary installation site; and a restoration step of, at the actual installation site a restoration, making the positioning member and the guide section contact each other with the positional relationship that is the same as that at the temporary installation site.

Still further, an embodiment of the invention is directed to the stage apparatus assembling method including: a fine adjustment step of finely adjusting the relative positional relationship between the sub base plate and the main base plate which are in the coarsely-adjusted positional relationship to a finely-adjusted positional relationship including a fine adjustment error being smaller than the coarse adjustment error, after the coarse adjustment step and before the temporary positioning step at the temporary installation site.

Furthermore, an embodiment of the present invention is directed to a stage apparatus assembling method of assembling a separable stage apparatus including: a coarse adjustment step of positioning a sub mounting table having a sub base plate with respect to a main mounting table having a main base plate by a coarse adjustment mechanism within a range of a coarse adjustment error, and fixing the coarse adjustment mechanism; a temporary positioning step of bringing a guide section, which is disposed on the main mounting table and movable with respect to the main mounting table, into contact with a positioning member disposed on the sub mounting table and fixing the guide section; a fine adjustment step of positioning the sub base plate with respect to the main base plate by a fine adjustment mechanism within a range of a fine adjustment error and fixing the fine adjustment mechanism; a separation step of moving the sub mounting table with respect to the main mounting table and separating the main mounting table from the sub mounting table; and an assembly step of moving the sub mounting table to the displaced main mounting table such that the positioning mechanism is positioned with respect to the guide section at the same position as in the temporary positioning step, in which the fine adjustment error is smaller than the coarse adjustment error.

Still further, an embodiment of the present invention is directed to the stage apparatus assembling method including a fine readjustment step of finely readjusting the sub base plate with respect to the main base plate by the fine adjustment mechanism after the assembly step.

Still further, an embodiment of the present invention is directed to the stage apparatus assembling method, wherein the guide section includes a rotor, and wherein the positioning member contacts the guide section in a state that the main mounting table and the sub mounting table are separate from each other, and when the sub mounting table is moved closer to the main mounting table, the positioning member moves along the guide section and the rotor of the guide section guides the positioning member while rotating.

With these arrangements, the position alignment accuracy between a main base plate and a sub base plate can be improved, and the work performed at the installation site can be simplified.

BRIEF DESCRIPTION OF THE DRAWINGS

FIG. 1(*b*) is a side view of the main mounting table illustrated in FIG. 1(*a*).

FIG. 2(*b*) is a side view of the sub mounting table illustrated in FIG. 2(*a*).

FIG. 5(*b*) is a side view of the stage apparatus of FIG. 5(*a*).

FIG. 6(*b*) is a side view of the stage apparatus of FIG. 6(*a*).

FIG. 9(*a*) is a plan view of a stage apparatus of a conventional technology.

FIG. 9(*b*) is a side view of the stage apparatus of FIG. 9(*a*).

FIG. 10(*a*) is a plan view of the stage apparatus in the conventional technology.

FIG. 10(*b*) is a side view of the stage apparatus of FIG. 10(*a*).

DETAILED DESCRIPTION OF THE INVENTION

Figure 5:
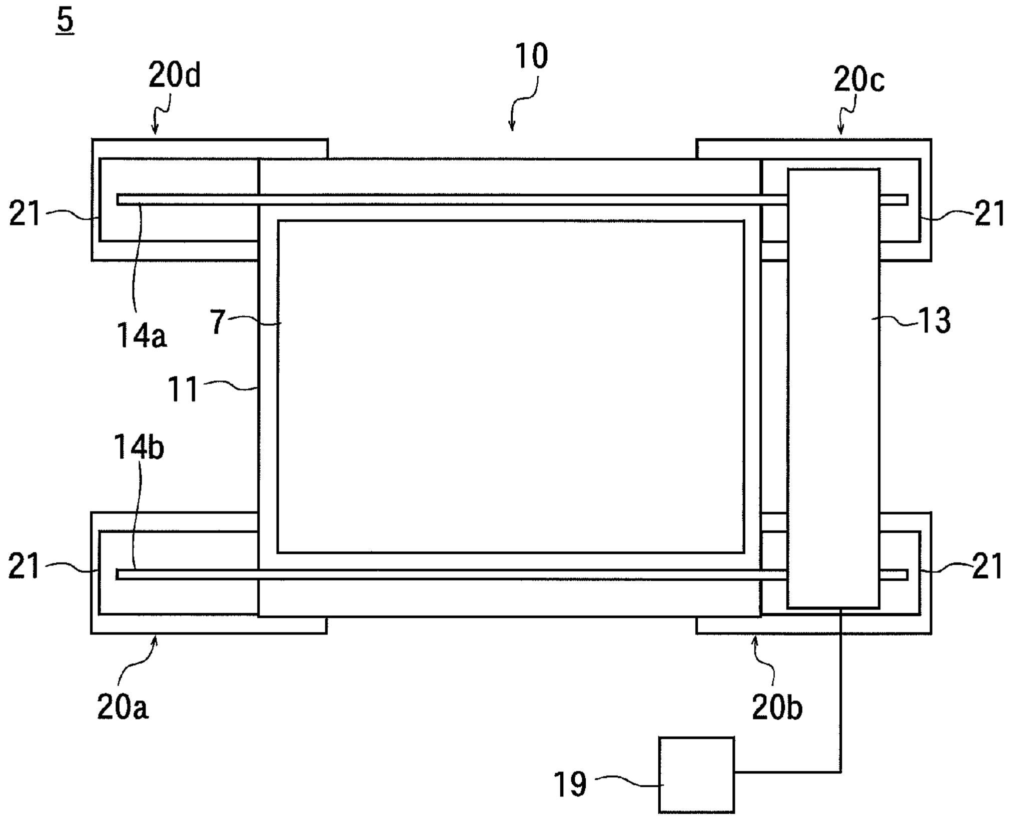
FIG. 5(*a*) is a plan view of a stage apparatus which is assembled at the actual installation site and to which an ejection device is disposed on the sub mounting table.
Figure 5:
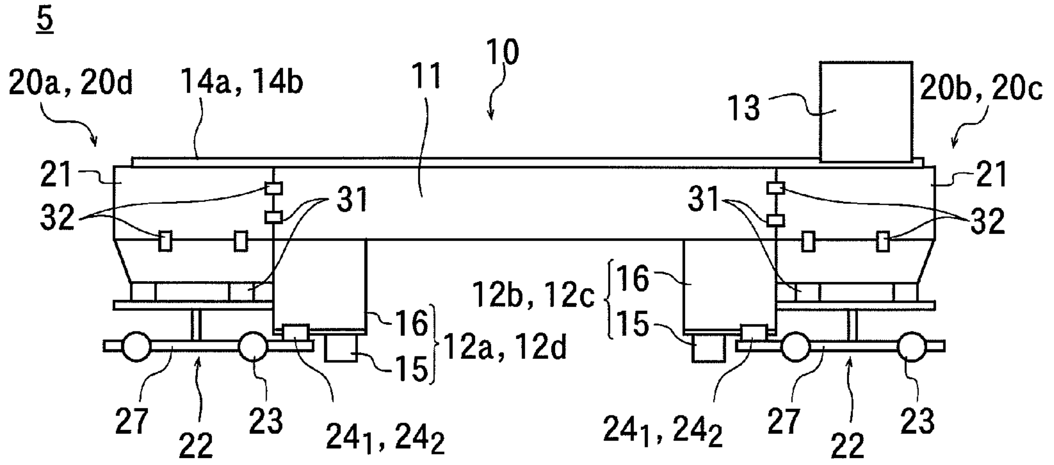

The reference numeral 5 in FIGS. 5(*a*) and 5(*b*) represents a stage apparatus according to an embodiment of the present invention. FIG. 5(*a*) is a plan view, and FIG. 5(*b*) is a side view of the stage apparatus 5.

This stage apparatus 5 includes a main mounting table 10 and a plurality of sub mounting tables 20*a* to 20*d*.

The main mounting table 10 and the sub mounting tables 20*a* to 20*d* have a main base plate 11 and a plurality of sub base plates 21, the surfaces of which are flat. The surfaces of the main base plate 11 and the sub base plates 21 are disposed so as to be horizontal and to have the same height from the floor.

The planar shape of the main base plate 11 is rectangular, and the rails 14*a*, 14*b* are arranged along two parallel sides of the four sides of the rectangle.

Both ends of the rails 14*a* and 14*b* are disposed so as to protrude out of the main base plate 11, and the sub base plates 21 of the sub mounting tables 20*a* to 20*d* are disposed respectively under the protruded portions of the rails 14*a* and 14*b*. Thus, the end portions of both the rail 14*a* and the rail 14*b* are positioned on the sub mounting tables 20*a* to 20*d*, and the portions of the rails 14*a* and 14*b* in between the end portions are positioned on the main mounting table 10.

A movable moving member (a gantry in the present embodiment) is disposed on the rails 14*a*, 14*b*, and an ejection device 13 is mounted on the gantry.

A print head (not shown in the drawings) is provided at the bottom surface portion of the ejection device 13. The ejection device 13 is connected to a tank 19 containing the ejection liquid. When the print head is operated while the ejection liquid is supplied from the tank 19, the ejection liquid is ejected from the print head.

A substrate 7 is disposed on the main mounting table 10 between the rail 14*a* and rail 14*b*.

Figure 6:
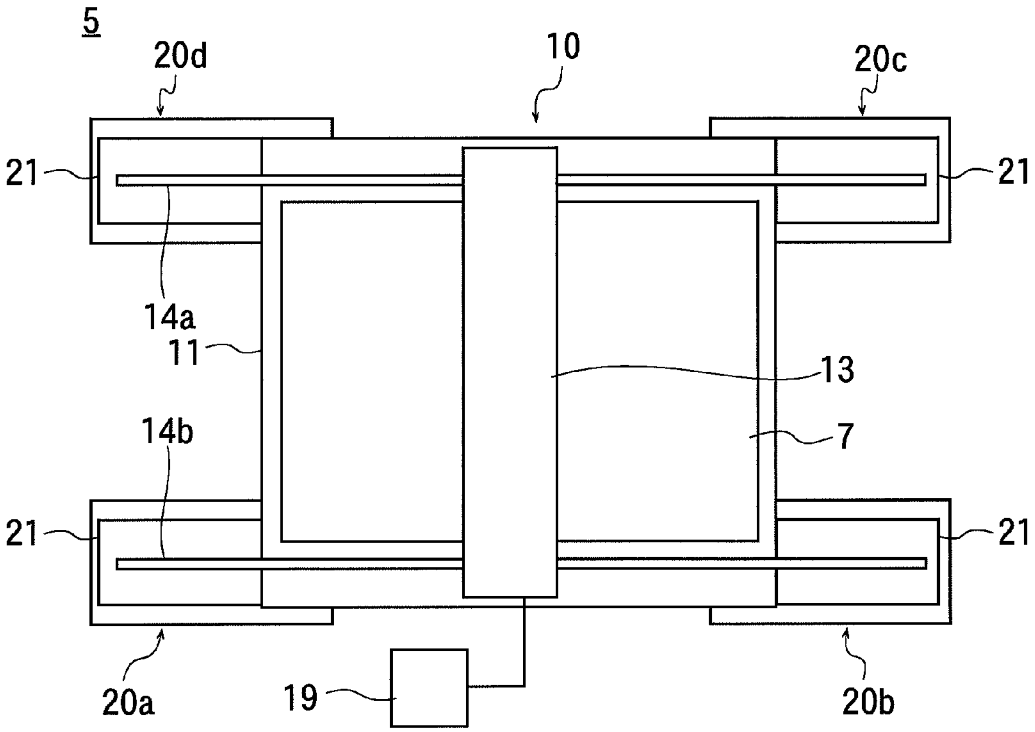
FIG. 6(*a*) is a plan view of a stage apparatus in a state in which an ejection device is disposed on the main mounting table of the stage apparatus assembled at the actual installation site.
Figure 6:
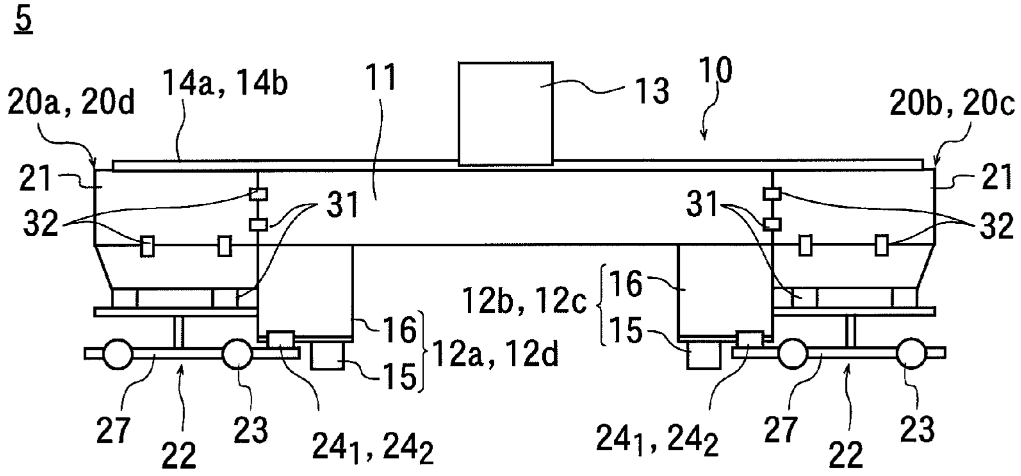

The ejection device 13 is arranged so as to be able to move along the rails 14*a* and 14*b*. As shown in FIG. 6, when the ejection liquid is ejected from the print head while the ejection device 13 is located on the substrate 7, the ejection liquid lands on the surface of the substrate 7. By moving the ejection device 13, the ejection liquid can be applied to a desired position on the surface of the substrate 7.

The stage apparatus 5 is disposed at the actual installation site where the ejection is applied to the substrate 7. However, since the main base plate 11 is large, the main base plate 11 cannot be transported from an assembly site to the actual installation site in the state shown in FIGS. 5 and 6, with the sub mounting tables 20*a* to 20*d* coupled to the main mounting table 10 and with the main base plate 11 and sub base plates 21 assembled.

Accordingly, it is desired that the stage apparatus 5 according to the present embodiment is carried to the actual installation site in a state that the main mounting table 10 and the sub mounting tables 20*a* to 20*d* are separated from each other. The main base plate 11 and the sub base plates 21 are then aligned and coupled with each other accurately and quickly at the actual installation site. Therefore, in order to reduce the work that is required at the actual installation site as much as possible, it is necessary to perform some preparatory work prior to the delivery to the actual installation site.

Figure 1:
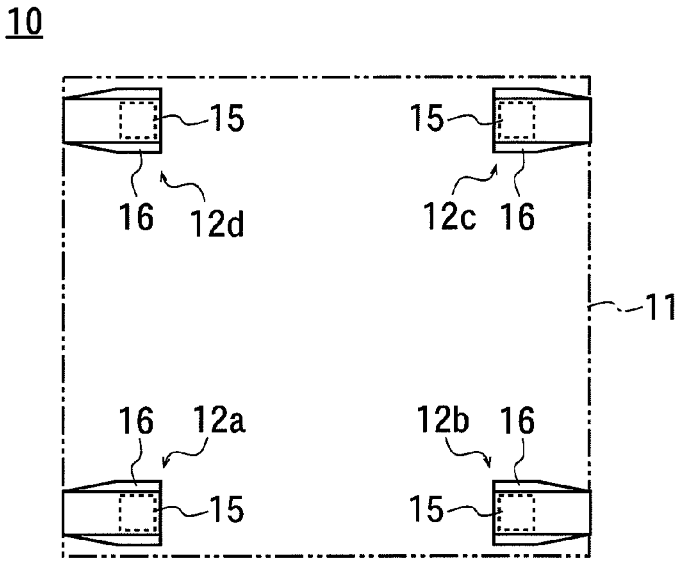
FIG. 1(*a*) is a plan view illustrating a main mounting table at a temporary installation site.
Figure 1:
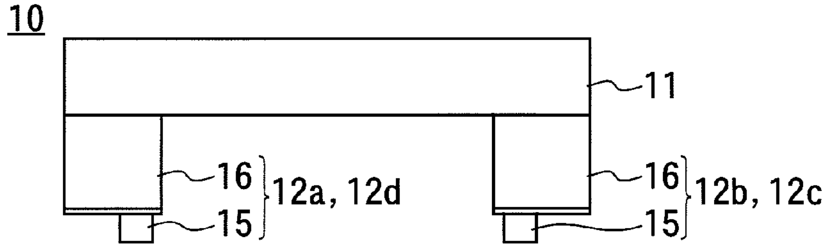

FIG. 1(*a*) is a plan view of the main mounting table 10 in a state of being disposed, not at the actual installation site, but at a temporary installation site; and FIG. 1(*b*) is a side view of the main mounting table 10.

The leg sections 12*a* to 12*d* are disposed near the four corners of the back surface of the main base plate 11.

In FIG. 1(*a*), the main base plate 11 is shown by two-dot chain lines, and the parts of the leg sections 12*a* to 12*d* are shown by solid lines. The leg sections 12*a* to 12*d* are fixed to the back surface of the main base plate 11.

Figure 2:
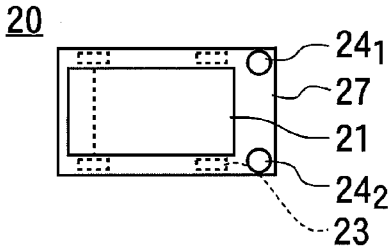
FIG. 2(*a*) is a plan view illustrating a sub mounting table at the temporary installation site.
Figure 2:
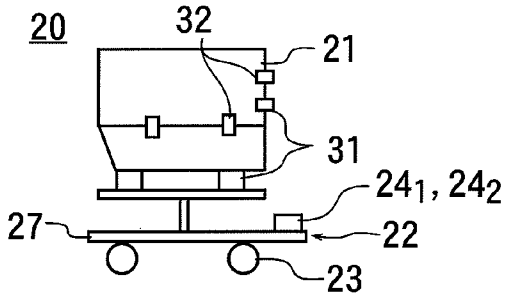

Next, FIG. 2(*a*) is a plan view of the sub mounting tables 20*a* to 20*d*; and FIG. 2(*b*) is a side view thereof.

The sub mounting tables 20*a* to 20*d* each have a vehicle section 22, and the sub base plates 21 are mounted on the vehicle sections 22.

Each vehicle section 22 is provided with a plurality of transporting wheels 23. In the present embodiment, the transporting wheels 23 are arranged at four positions on the bottom surface of a pedestal 27 of the vehicle section 22.

The main base plate 11 and the sub base plates 21 are in a rectangular or square shape. The width of the sub base plates 21 is set to be equal to or smaller than a half of the width of the main base plate 11. Two sub base plates 21 are connected to each two end portions of the rails 14*a* and 14*b* that protrude out of the main base plate 11.

The transporting wheels 23 are arranged so that the transporting wheels 23 are able to move in a forward or backward direction, the portions of the main base plate 11 on which the sub base plates 21 are connected to the main base plate 11 being considered the heads of the sub mounting tables 20*a* to 20*d*. When the transporting wheels 23 touch the floor and a force is applied in the forward or backward direction, the transporting wheels 23 rotate and the sub mounting tables 20*a* to 20*d* run on the floor in the direction along which the force is applied.

The vehicle sections 22 are provided with the pedestals 27. At the head of the sub mounting tables 20*a* to 20*d* in the direction of forward movement, the positioning members $\mathbf{24}_1$, $\mathbf{24}_2$ formed of a roller are separately disposed from each other at both sides of the moving direction.

Each of the leg sections 12*a* to 12*d* is in contact with the floor and has a support section 15 for supporting the main base plate 11 and a guide section 16 in a plate shape provided on the side surfaces of the outer circumference of the support section 15. The guide sections 16 are disposed above the floor at a constant distance from the floor, and gaps exist between the guide sections 16 and the floor.

Figure 3:
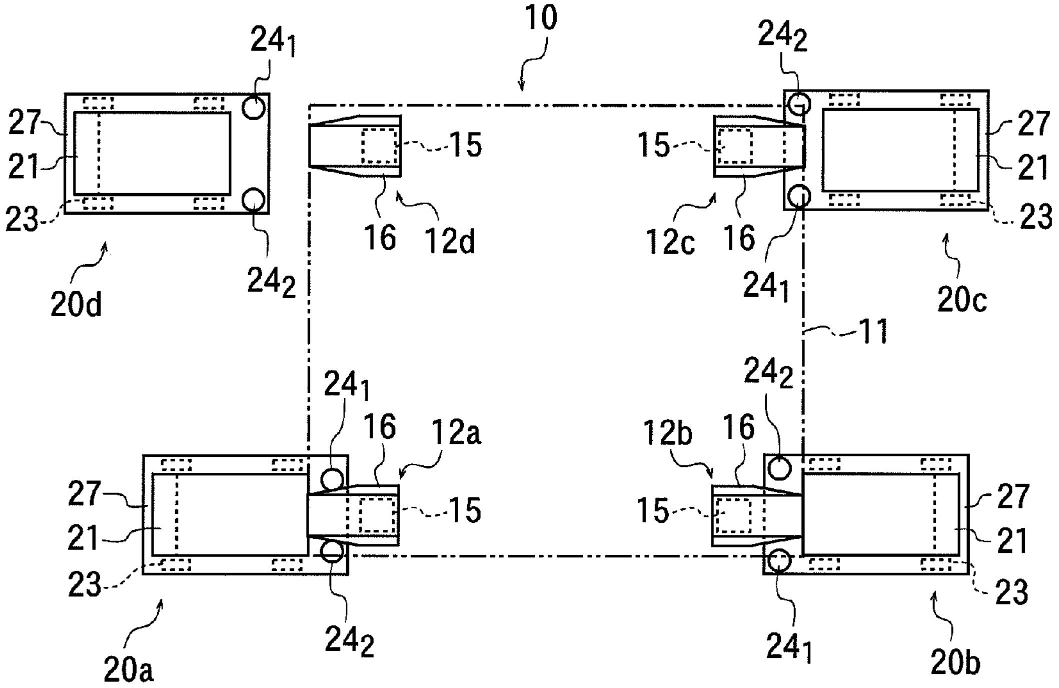
FIG. 3 is an inner plan view illustrating a procedure of coupling the sub mounting table with the main mounting table at the temporary installation site.

The positioning members $\mathbf{24}_1$, $\mathbf{24}_2$ are arranged such that their positions on the pedestals 27 can be changed. The distance between the positioning members $\mathbf{24}_1$, $\mathbf{24}_2$ is set to be large in advance. Each sub mounting table, such as the sub mounting table 20*b* shown in FIG. 3, is moved forward with the front end thereof directed toward the portion where the main base plate 11 is connected with the sub base plate 21. Then, the pedestal 27 is inserted between the guide section 16 and the floor as illustrated by the sub mounting table 20*a* in the same figure.

The guide sections 16 are disposed along the portions of the side surfaces of the leg sections 12*a* to 12*d*, in parallel to the forward direction of the sub mounting tables 20*a* to 20*d*.

The positioning members $\mathbf{24}_1$, $\mathbf{24}_2$ are disposed at the same height as the guide sections 16, and the positioning members $\mathbf{24}_1$, $\mathbf{24}_2$ are separated from each other by a distance that is larger than the width of the guide sections 16 in advance such that the pedestal 27 can be inserted under the guide sections 16, even without being in a contact with the guide sections 16.

Each sub mounting table, as the sub mounting table 20*b* shown in the same figure, is moved forward until it contacts the side where the sub base plate 21 and the main base plate 11 is connected to each other.

In this state, the error in alignment is far from that of the ideal positional relationship between the main base plate 11 and the sub base plate 21.

The sub mounting tables 20*a* to 20*d* or the main mounting table 10 is provided with coarse adjustment mechanisms 31 and fine adjust mechanisms 32, which are capable of adjusting the position in the height direction and with respect to the inclination of the sub base plate 21 and the position and the orientation of the horizontal surface of the sub base plate 21 with respect to the main base plate 11.

Although the adjustment accuracy of the fine adjustment mechanisms 32 is higher than that of the coarse adjustment mechanisms 31, since the amounts of adjustment by the coarse adjustment mechanisms 31 are larger than those by the fine adjustment mechanisms 32, the position alignment of the sub base plates 21 with the main base plate 11 is first performed by the coarse adjustment mechanisms 31 respectively for the sub mounting tables 20*a* to 20*d*.

Assuming that the floor of the temporary installation site is leveled and that the main base plate 11 is set to be horizontal in advance by a main adjustment mechanism (not shown in drawings) provided on the main mounting table 10, the sub base plates 21 are made horizontal at substantially the same height as the surface of the main base plate 11 and the relative positions and directions thereof with respect to the main base plate 11 are coarsely adjusted by the coarse adjustment mechanisms 31. Thus, a schematic position alignment is performed.

Although there exists an error in alignment in this state when compared to the state of the ideal position alignment, if the initial error $E_1$ represents the error amount (The error amount is an absolute value and is taken as a positive number, here.) before the coarse adjustment and the coarse adjustment error $E_2$ represents the error amount (The error amount is an absolute value and is taken as a positive number, here.) after the coarse adjustment, the coarse adjustment error $E_2$ is smaller than the initial error $E_1$ by the amount of the coarse adjustment.

After the coarse adjustment, the sub base plates 21 are in contact with the main base plate 11, and the sub mounting tables 20*a* to 20*d* cannot move forward but can move in the left-right direction and in the backward direction.

Next, by fixing the coarse adjustment mechanisms 31, the coarse adjustment between the sub base plates 21 and the main base plate 11 is carried out, and the errors between the sub base plates 21 and the main base plate 11 are set not to be larger than the coarse adjustment error $E_2$. While maintaining this state, the positioning members $\mathbf{24}_1$ and $\mathbf{24}_2$ are moved closer to each other so as to be brought into contact with the sides of the guide sections 16, and the positioning members $\mathbf{24}_1$ and $\mathbf{24}_2$ sandwiches the guide sections 16 of the leg sections 12*a* to 12*d*.

The support sections 15 are located more inward than the outer circumference of the main base plate 11. The guide section 16 is formed so as to be wider at the portion which is near the support section 15 and far from the outer circumference of the main base plate 11 and to be narrower at the portion which is near the outer circumference of the main base plate 11. By fixing the positioning members $\mathbf{24}_1$, $\mathbf{24}_2$ on the pedestals 27 in a state that the positioning members $\mathbf{24}_1$, $\mathbf{24}_2$ sandwich the guide sections 16, the sub mounting tables 20*a* to 20*d* are able to move backward. However, the sub mounting tables 20*a* to 20*d* are unable to move forward and unable to move in the left-right direction with respect to the leg sections 12*a* to 12*d*. That is, the sub base plates 21 are in a state that the coarse position adjustment has been performed in the forward direction and the right-left direction with respect to the main base plate 11. In this state, the coarse position alignment in the height direction also has been completed.

Next, with the fine adjustment mechanisms 32, the height and inclination of the sub base plates 21, and the position and direction with respect to the main base plate 11, are finely adjusted for the respective sub mounting tables 20*a* to 20*d*.

Representing the error amount (The error amount is an absolute value and is taken as a positive number, here.) from the ideal position of the finely-adjusted sub base plates 21 with respect to the main base plates 11 by the fine adjustment error $E_3$, the fine adjustment error $E_3$ is nearly zero, and $E_1>E_2>E_3\approx 0$.

Figure 4:
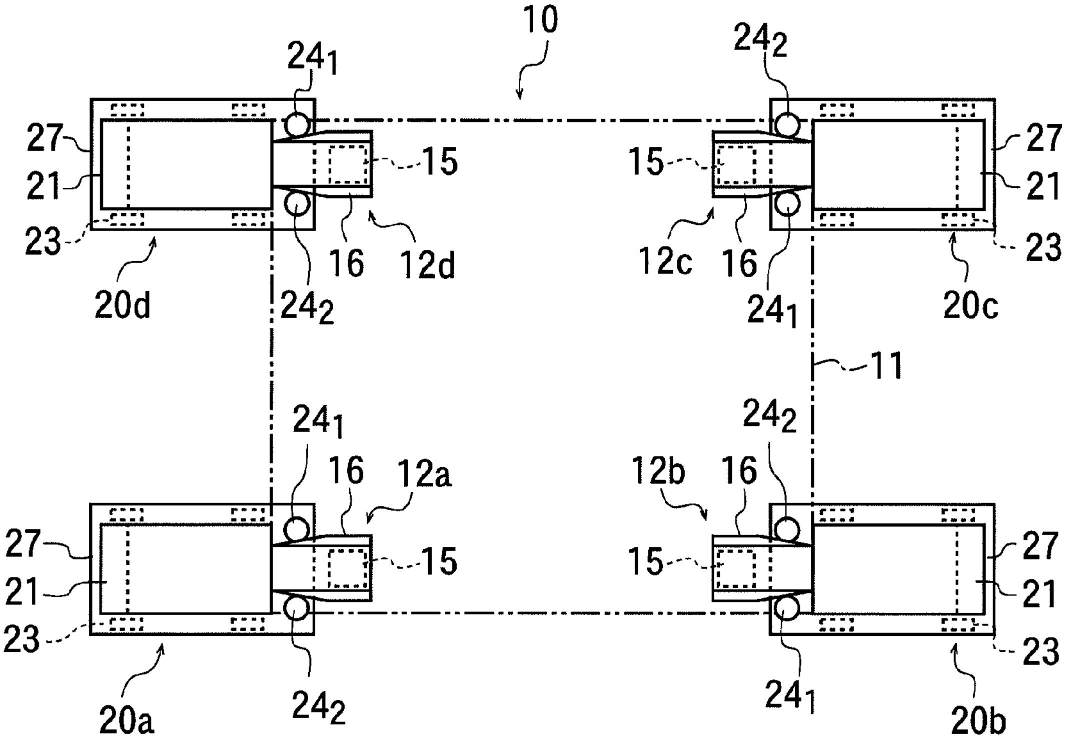
FIG. 4 is an inner plan view illustrating the main mounting table and sub mounting table in a state of being coupled to each other at the temporary installation site or at the actual installation site.

The fine adjustment mechanisms 32 are fixed so that the finely-adjusted state does not change; and then, by screw-fixing coupling plates (not shown in the drawings) between the members of the sub mounting tables 20*a* to 20*d* and the leg sections 12*a* to 12*d* of the main mounting table 10 or in another manner, as shown in FIG. 4, the sub mounting tables 20*a* to 20*d* are fixed to the main mounting table 10 to assemble them. When it is confirmed that the assembly can be carried out, the temporary assembly step is terminated.

After performing the above-described temporary assembly step at the temporary installation site, the fixing between the main mounting table 10 and the sub mounting tables 20*a* to 20*d* is released at the temporary assembly site. Although the positions of each sub base plate 21 and the main base plate 11 are still aligned with each other even in this state, when the sub mounting tables 20*a* to 20*d* are moved backward and the main mounting table 10 is separated from the sub mounting tables 20*a* to 20*d*, the tables can be transported individually.

At this moment, the necessary work is performed so that the fixing of the positioning members $\mathbf{24}_1$, $\mathbf{24}_2$ with respect to the pedestals 27 is not released; the distance between the positioning members $\mathbf{24}_1$, $\mathbf{24}_2$ is not changed; and the fixing (by the coarse motion screws and fine motion screws) of the coarse adjustment mechanisms 31 and fine adjustment mechanisms 32 is maintained so as not to change the state that the coarse adjustment and the fine adjustment have achieved.

The main mounting table 10 and the sub mounting tables 20*a* to 20*d* are individually loaded on a vehicle or the like, and transported to the actual installation site by land, sea, or the like. Then, the main mounting table 10 is first disposed at a predetermined position of the actual installation site.

Figure 7:
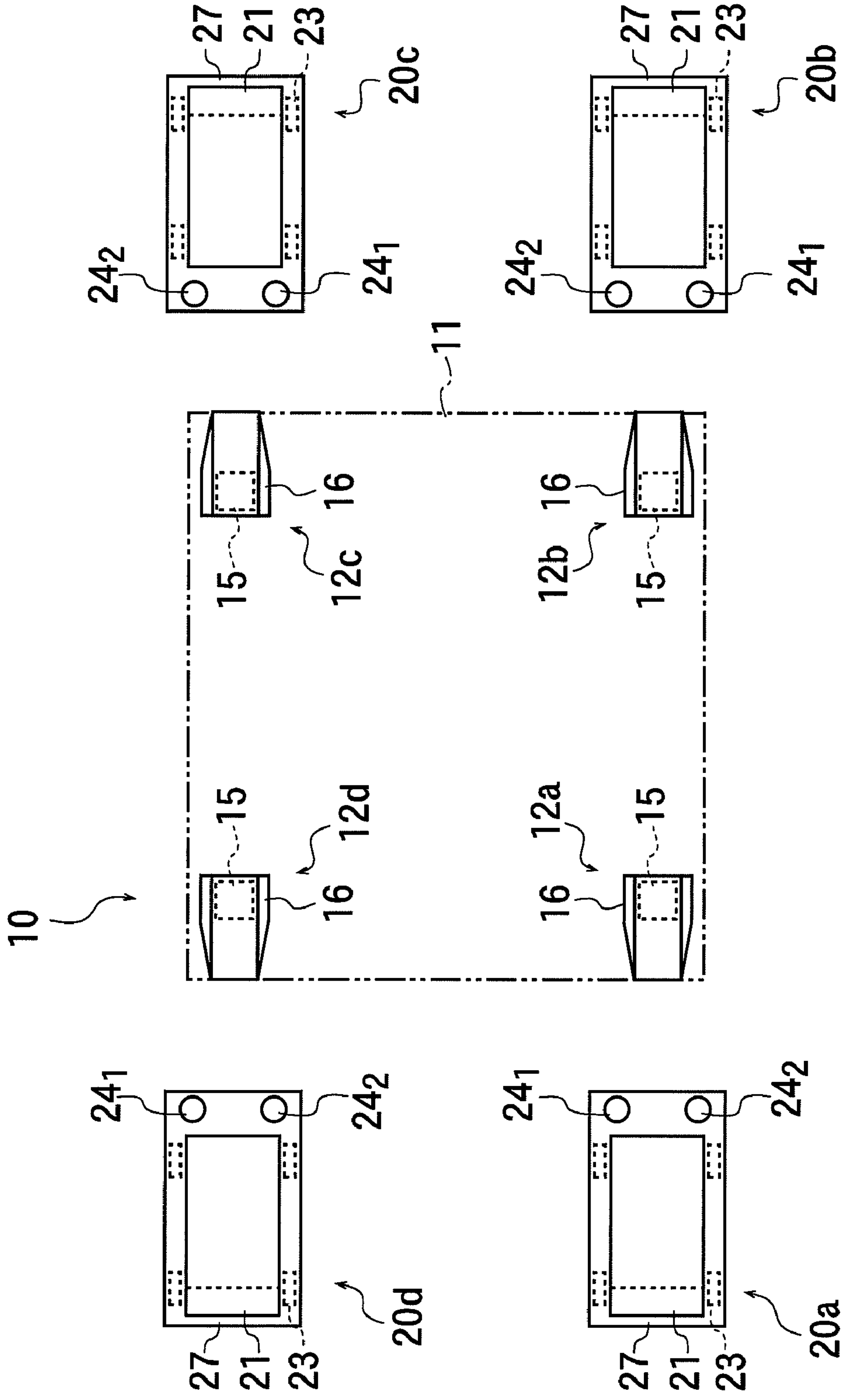
FIG. 7 is a plan view illustrating a procedure of coupling the sub mounting table with the main mounting table at the actual installation site.

Next, the sub mounting tables 20*a* to 20*d* are disposed toward the leg sections 12*a* to 12*d*, and, as shown in FIG. 7, the sub mounting tables 20*a* to 20*d* are directed toward the main mounting table 10 and moved forward to get closer to the main mounting table 10 while inserting the pedestals 27 thereof below the guide sections 16 so that its assembled state made at the temporary installation site can be restored.

The width of the guide sections 16 is larger toward the back side with respect to the moving direction of the sub mounting tables 20*a* to 20*d*. Accordingly, when the pedestals 27 of the respective sub mounting tables 20*a* to 20*d* enter below the guide sections 16, the guide sections 16 are inserted between the positioning members $\mathbf{24}_1$, $\mathbf{24}_2$; and, when the positioning members $\mathbf{24}_1$, $\mathbf{24}_2$ come in contact with the guide sections 16, the sub mounting tables 20*a* to 20*d* stops moving forward.

When the floor of the temporary installation site and that of the actual installation site are horizontal, and the positioning members $\mathbf{24}_1$, $\mathbf{24}_2$ and the guide sections 16 are in contact with each other at the same positions as the positions where they were in contact with each other at the temporary installation site, the positional relationship between the sub mounting tables 20*a* to 20*d* and the main mounting table 10 at the temporary assembly site is restored.

That is, the sub base plates 21 and the main base plate 11 are in the same state as the state after the coarse adjustment and the fine adjustment were performed. By fixing, with screws, the coupling plates between the members of the sub mounting tables 20*a* to 20*d* and the leg sections 12*a* to 12*d* of the main mounting table 10 or in another manner, when the sub mounting tables 20*a* to 20*d* are coupled with and fixed to the main mounting table 10, they are assembled in the same manner as shown in FIG. 4.

However, since the coupling between the sub mounting tables 20*a* to 20*d* and the main mounting table 10 is once released and the sub mounting tables 20*a* to 20*d* and the main mounting table 10 are separated from each other and transported, a small error in position alignment $E_4$ may occur.

This position alignment error $E_4$ is caused by the vibration and the change in temperature during the transportation and due to the resetting of the surface of the main base plate 11 to make it horizontal at the actual installation site. This position alignment error $E_4$ is comparable with the fine adjustment error $E_3$.

In order to eliminate the position alignment error $E_4$, before the sub mounting tables 20*a* to 20*d* are coupled with and fixed to the main mounting table 10, the surface of the main base plate 11 is first adjusted to be made horizontal by a main adjustment mechanism. Then, the heights and inclinations of the sub mounting tables 20*a* to 20*d* with respect to the vertical direction and the positions and directions thereof with respect to the main base plate 11 are finely adjusted by the fine adjustment mechanisms 32, and the sub mounting tables 20*a* to 20*d* are coupled with and fixed to the main mounting table 10. Subsequently, the position alignment error $E_4$ becomes small, and the position alignment error between the main base plate 11 and the sub base plates 21 can be made comparable to the fine adjustment error $E_3$ that was present before the transportation.

FIGS. 5(*a*) and 5(*b*) are a plan view and a side view, respectively, of the stage apparatus 5 assembled at the actual installation site using the above-described procedure. The rails 14*a* and 14*b* are installed straight over the main mounting table 10 and sub mounting tables 20*a* to 20*d*.

In these figures, the ejection device 13 is located on the sub mounting tables 20*b* and 20*c* which are disposed outside the main mounting table 10. The cleaning of the print head or the like can be performed at this position. Further, since the ejection device 13 is not on a substrate, it is possible to replace a substrate 7 on the main mounting table 10. Since the accuracy of the position alignment is high, even when the ejection device 13 is moved above and between the sub mounting tables 20*a* to 20*d* and the main mounting table 10 as shown in FIGS. 6(*a*) and 6(*b*), vibration does not occur.

As described above, in the present embodiment, before the sub mounting tables 20*a* to 20*d* and the main mounting table 10 are assembled at the actual installation site, preliminarily at the temporary installation site in the factory or the like where the stage apparatus 5 was fabricated, the relative positional relationship between the positioning members $\mathbf{24}_1$, $\mathbf{24}_2$ and the guide sections 16 is fixed in a state where the positions of the sub base plates 21 and the main base plate 11 are aligned with each other. Thus, the position alignment state between the sub base plates 21 and the main base plate 11 can be subsequently restored.

Accordingly, even if the main mounting table 10 and the sub mounting tables 20*a* to 20*d* are separated from each other and then transported, when the positional relationship between the positioning members $\mathbf{24}_1$, $\mathbf{24}_2$ and the guide sections 16 is restored, the positional relationship between the sub base plates 21 and the main base plate 11 is also restored, and thus the state of position alignment can be reproduced.

In the above-described embodiment, the guide sections 16 are formed of plate-shaped members, and the positioning members $\mathbf{24}_1$ and $\mathbf{24}_2$ are formed of rollers in contact with the side surfaces of the guide members 16. However, the guide sections 16 and the positioning members $\mathbf{24}_1$, $\mathbf{24}_2$ are not limited thereto, and any types of members may suffice as long as the relative positional relationship between the sub base plates 21 and the main base plate 11 can be reproduced. The guide sections may be formed of rollers, and the positioning members may be formed of plate-shaped members. In this case, the guide sections of the main mounting table side may be arranged so as to be movable with respect to the main mounting table and to be fixed in contact with the positioning members of the sub mounting tables.

Figure 8:
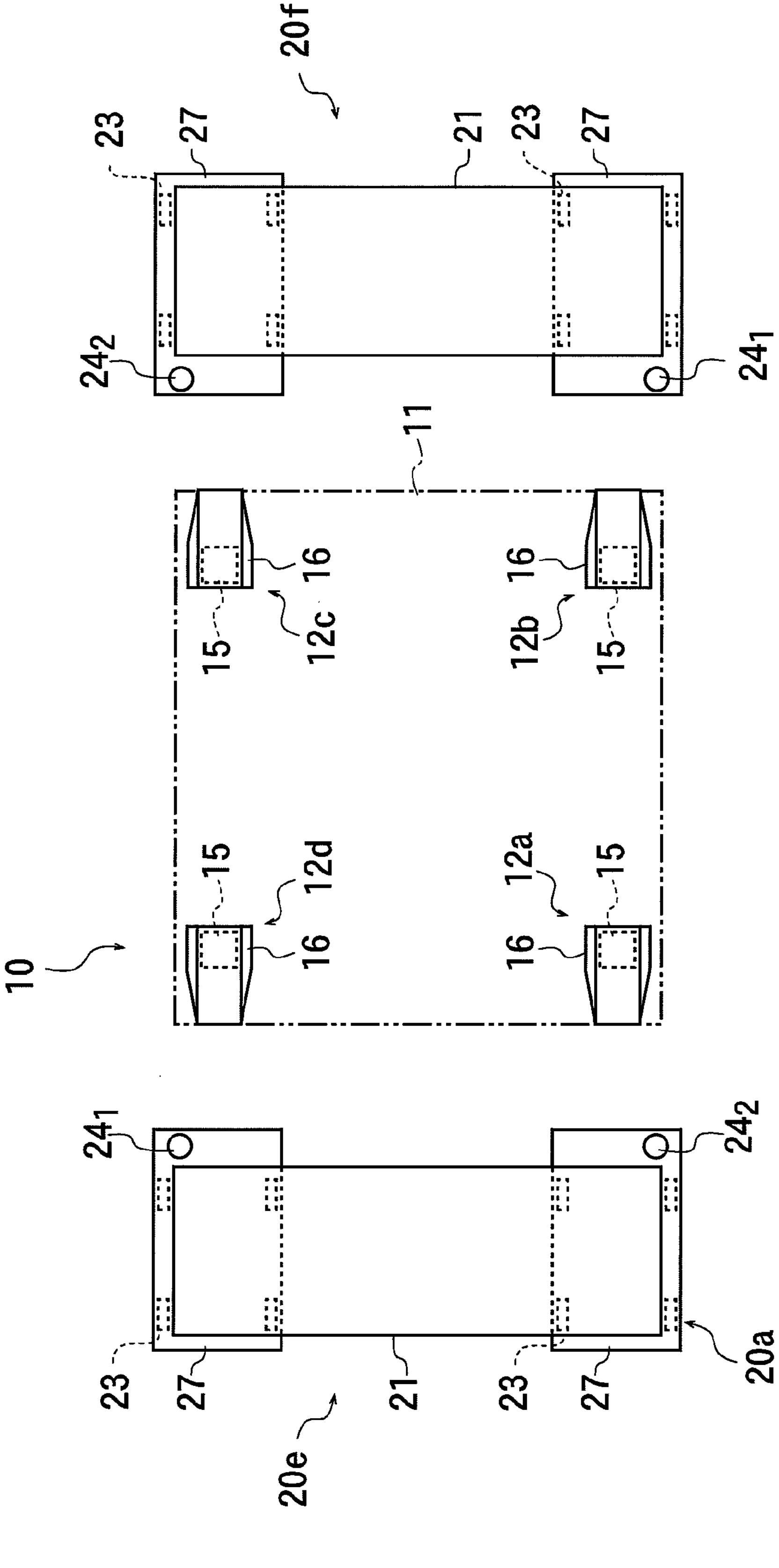
FIG. 8 is a plan view illustrating another embodiment of a sub mounting table.

In the above description, the four sub mounting tables 20*a* to 20*d* having respective sub base plates 21 are coupled with the four leg sections 12*a* to 12*d* respectively. However, wide sub base plates 21 may be arranged on two sub mounting tables 20*e* and 20*f* such that one sub base plate 21 supports one end portions of the two rails 14*a* and 14*b*, In addition, as shown in FIG. 8, the sub mounting tables 20*e* and 20*f* may be coupled respectively with two out of the four leg sections 12*a* to 12*d*. Also, in such a case, the positions of the sub base plates 21 of the sub mounting tables 20*e* and 20*f* and the main base plate 11 of the main mounting table 10 are aligned with each other at the temporary installation site in advance, and the position alignment is restored at the actual installation site.

Further, in the above-described embodiment, the ejection device 13 may be disposed above the main mounting table 10 and the sub mounting tables 20*a* to 20*d* of the stage apparatus 5 and can be used as an inkjet device. However, the invention is not limited thereto. A laser irradiation device may be disposed above the stage apparatus 5 of the present invention and can be used as a heating device, inspection device, or an exposure device; or, a substrate position alignment device may be disposed and can be used as an aligner.

In short, the stage apparatus 5 of the present invention is not limited to a stage apparatus for an inkjet device.

Further, a member movable on the rails 14*a* and 14*b* is not limited to a gantry, and may be a mounting table to mount an object to be processed, such as a substrate.

What is claimed is:

1. A stage apparatus assembling method of assembling a separable stage apparatus, the method comprising:

a coarse adjustment step of positioning a sub mounting table having a sub base plate with respect to a main mounting table having a main base plate by a coarse adjustment mechanism within a range of a coarse adjustment error and fixing the coarse adjustment mechanism;

a temporary positioning step of bringing a guide section, which is disposed on the main mounting table and is movable with respect to the main mounting table, into contact with a positioning member disposed on the sub mounting table and fixing the guide section;

a fine adjustment step of positioning the sub base plate with respect to the main base plate by a fine adjustment mechanism within a range of a fine adjustment error and fixing the fine adjustment mechanism;

a separation step of moving the sub mounting table with respect to the main mounting table and separating the main mounting table from the sub mounting table; and an assembly step of moving the sub mounting table to the displaced main mounting table such that the positioning mechanism is positioned with respect to the guide section at the same position as in the temporary positioning step, wherein the fine adjustment error is smaller than the coarse adjustment error.

2. The stage apparatus assembling method according to claim 1, further comprising a fine readjustment step of finely readjusting the sub base plate with respect to the main base plate by the fine adjustment mechanism after the assembly step.

3. The stage apparatus assembling method according to claim 1, wherein the guide section includes a rotor; and wherein the positioning member contacts the guide section in a state that the main mounting table and the sub mounting table are separate from each other, and when the sub mounting table is moved closer to the main mounting table, the positioning member moves along the guide section and the rotor of the guide section guides the positioning member while rotating.

* * * * *